Patented Dec. 2, 1924.

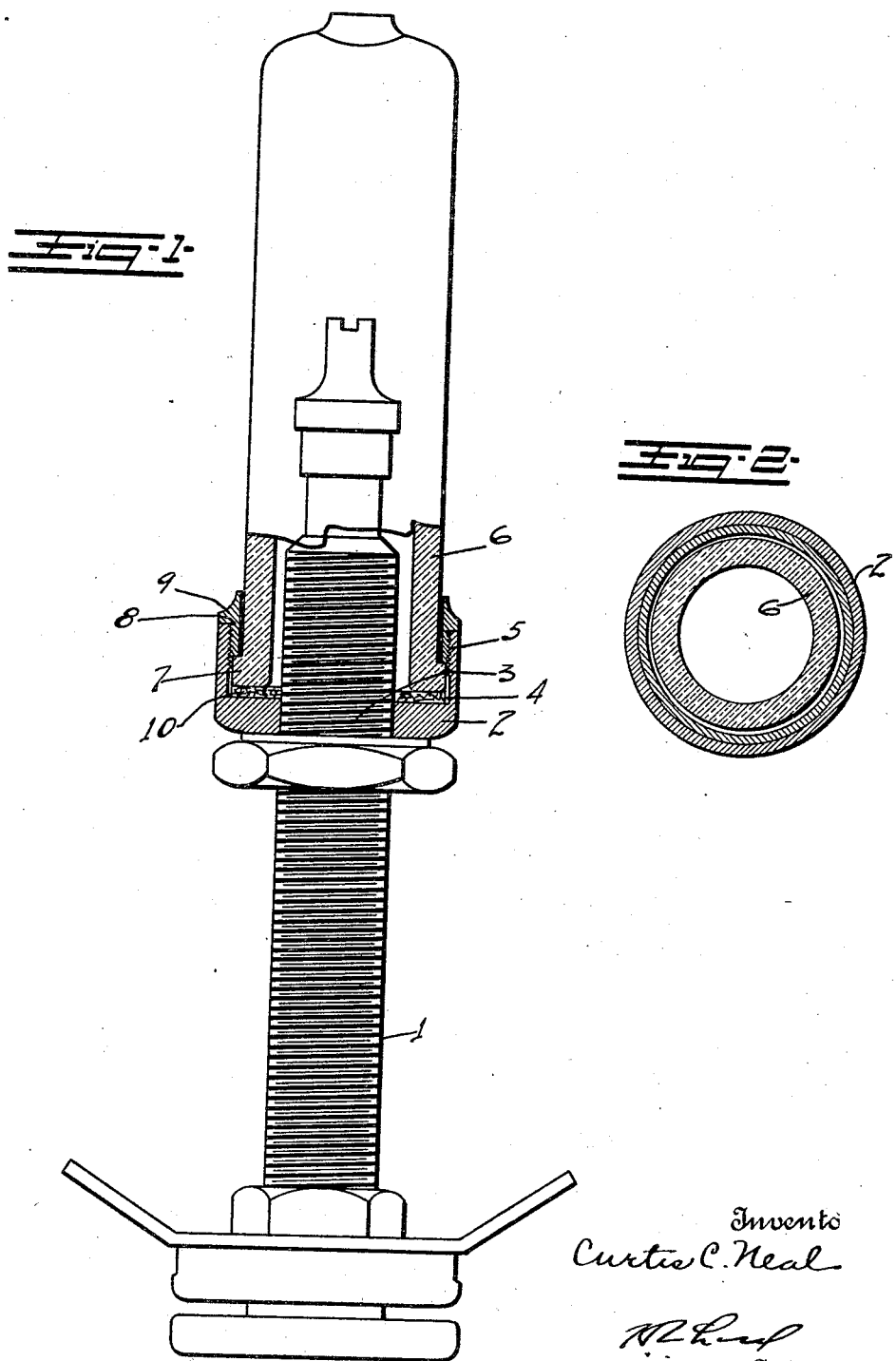

1,517,378

UNITED STATES PATENT OFFICE.

CURTIS C. NEAL, OF MARMET, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

TRANSPARENT CAP FOR PNEUMATIC-TIRE-STEM PRESSURE GAUGES.

Application filed October 21, 1922. Serial No. 595,977.

*To all whom it may concern:*

Be it known that I, CURTIS C. NEAL, a citizen of the United States, residing at Marmet, in the county of Kanawha and State of West Virginia, have invented new and useful Improvements in Transparent Caps for Pneumatic-Tire-Stem Pressure Gauges, of which the following is a specification.

This invention is designed to improve transparent caps used in connection with pneumatic tire stem pressure gauges. Such caps are ordinarily formed of glass and are provided with a metal base which is secured to the stem. The mounting of the glass in the metal base has presented a problem of some difficulty in that it is desirable to have the connection rigid. At the same time the connection must be yielding enough to prevent undue strain on the glass. Further in assembling it is desirable to have the structure such that when the glass is broken the base may be used in another assembly.

The invention is illustrated in the accompanying drawings as follows:—

Fig. 1 shows a side elevation of the device, partly in section.

Fig. 2 a plan view of the cap.

1 represents the usual pressure gauge stem adapted to be attached to a pneumatic tire.

The metal base 2 has a screw-threaded opening 3 adapting it to be screwed on to the stem 1. The base is provided with a socket 4, the wall of which is internally screw-threaded at 5.

A glass cap 6 is mounted in the socket 4, the cap having an external shoulder 7 at its lower end. A nut 8 is screwed into the screw-threaded walls 5. This nut surrounds the glass cap above the shoulder and rests upon the shoulder, thus securing it in the socket. The upper end of the nut is provided with a flange 9 which extends from and engages the top of the wall of the socket. This flange is also provided with a contour forming a wrenchhold so that it may be readily assembled.

An elastic washer 10 is arranged in the bottom of the socket and the bottom of the glass cap seats on this washer.

The nut is set with the flange 9 against the top of the wall of the socket and the washer yields sufficiently to avoid undue strain on the glass cap. In this way the locking of the nut in place is assured without straining the glass.

What I claim as new is:—

1. A transparent cap for pneumatic tire stem pressure gauges comprising a base having a screw-threaded opening therein adapted to receive a tire stem and a socket with an internally screw-threaded wall; a transparent cap having an external shoulder at its open end arranged in said socket; and a nut surrounding the cap above the shoulder and resting on the shoulder, said nut being screwed into the socket and having a flange engaging the top of the wall of the socket.

2. A transparent cap for penumatic tire stem pressure gauges comprising a base having a screw-threaded opening therein adapted to receive a tire stem and a socket with an internally screw-threaded wall; a transparent cap having an external shoulder at its open end arranged in said socket; a nut surrounding the cap above the shoulder and resting on the shoulder, said nut being screwed into the socket and having a flange engaging the top of the wall of the socket; and an elastic washer in the bottom of the socket against which the cap is seated.

In testimony whereof I have hereunto set my hand.

CURTIS C. NEAL.